United States Patent [19]
Dubach

[11] Patent Number: 5,494,185
[45] Date of Patent: Feb. 27, 1996

[54] PLASTIC SNAP HINGE

[75] Inventor: Werner F. Dubach, Maur, Switzerland

[73] Assignee: Createchnic AG, Switzerland

[21] Appl. No.: 219,800

[22] Filed: Mar. 29, 1994

[30] Foreign Application Priority Data

Mar. 30, 1993 [CH] Switzerland ................. 00971/93

[51] Int. Cl.⁶ .................................................. B65D 43/14
[52] U.S. Cl. .................................... 220/339; 215/235
[58] Field of Search .................... 220/339, 254; 215/235

[56] References Cited

U.S. PATENT DOCUMENTS

| | | |
|---|---|---|
| 4,414,705 | 11/1983 | Ostrowsky . |
| 4,696,408 | 9/1987 | Dubach . |
| 4,717,033 | 1/1988 | Dubach . |
| 4,722,449 | 2/1988 | Dubach . |
| 4,854,473 | 8/1989 | Dubach . |
| 4,911,324 | 3/1990 | Dubach ................. 215/237 X |
| 4,949,883 | 8/1990 | Dubach . |
| 4,989,744 | 2/1991 | Tominaga ............... 220/339 |
| 5,094,361 | 3/1992 | Dubach . |
| 5,115,931 | 5/1992 | Dubach . |
| 5,257,708 | 11/1993 | Dubach . |
| 5,322,176 | 6/1994 | Dubach ................. 220/339 X |
| 5,356,018 | 10/1994 | Dubach ................. 220/254 X |
| 5,392,938 | 2/1995 | Dubach . |

FOREIGN PATENT DOCUMENTS

| | | |
|---|---|---|
| 0056469 | 6/1985 | European Pat. Off. . |
| 0141591 | 6/1988 | European Pat. Off. . |
| 0291457 | 9/1990 | European Pat. Off. . |
| 0447357 | 9/1991 | European Pat. Off. . |

*Primary Examiner*—Allan N. Shoap
*Assistant Examiner*—Robin A. Hylton
*Attorney, Agent, or Firm*—Speckman, Pauley & Fejer

[57] ABSTRACT

A plastic closure having a lower part attachable to a container, and a cap which is connected with the lower part by a main film hinge. A spring element engages the lower part and the cap, and also bridges an axis of rotation of the main film hinge and thus generates a snap effect. The main film hinge extends continuously through an area in which the main film hinge is bridged by the spring element. In a closed state of the plastic closure, each spring element is hidden completely within the closed closure.

14 Claims, 3 Drawing Sheets

PLASTIC SNAP HINGE

BACKGROUND OF THE INVENTION

1. Field of the Invention

This invention relates to a plastic snap hinge closure, having a first part to be fastened on a container and a second part, which is connected in one piece with the first part by a main film hinge, and wherein at least one spring element engages both parts and bridges the axis of rotation of the main film hinge. This invention also relates to a process for manufacturing such a plastic snap hinge closure.

2. Description of Prior Art

European Patent Publications EP-B-0 141 591 and EP-A-0 447 357 and U.S. Pat. No. 4,414,705 provide examples of such closures. The stability and durability of a plastic closure is essentially determined by the design of the hinge. A problem arises with snap hinge closures since the main film hinge connecting the two hingedly connected closure parts must often be relatively short in length and must be interrupted at least in the area of the spring elements, which generate a snap effect. Examples of the design of such snap hinge closures are described in the above-mentioned patent references.

In all of these conventional snap hinge closures, the main film hinge is interrupted by a spring element which is centered between the two parts, so that it is reduced to the two parts of the main film hinge remaining on either side of the spring element. In such closures, with the exception of the embodiment taught by European Patent Publication EP-A-0 447 357, the main film hinge or portions of the main film hinge are offset towards the outside, relative to the circumference of the closure. Besides the lack of a pleasing esthetic appearance, this results in a considerable reduction in the length of the main film hinge and also results in a weakening of the hinge and thus of the entire plastic closure.

Other conventional plastic closures, which were first marketed by Applicant, have two or more spring elements that act as tightening straps. This type of plastic closures avoids the incisions otherwise required on both sides of the spring elements, and the main film hinge is not interrupted. However, these closures were also unable to satisfy the esthetic requirements of the marketplace. Added to this was the fact that the spring element protruded beyond the circumference of the closure and certain problems occurred in connection with automatic filling and closing devices. These difficulties are avoided by a further development of the plastic closure in accordance with European Patent Publication EP-B-0 291 457. Here, the spring elements on either side of the main film hinge are relocated into recesses in the casing walls of the upper and lower part of the plastic closure. But here, too, the spring elements in the form of trapezoidal tightening straps are clearly visible from the exterior of the closure.

The length of the main film hinge is also again limited to the distance between the two spring elements. Something similar is true for the plastic closures in accordance with European Patent Disclosure EP-B-0 056 469. Such spring elements are either spiral springs or tension elements and extend with their auxiliary film hinges into an extremely short main film hinge. This results in an imprecise closing operation and also reduces the stability of the hinge.

SUMMARY OF THE INVENTION

It is therefore one object of this invention to provide a plastic closure of the above-mentioned type, wherein the above-mentioned disadvantages of the plastic closures in accordance with the prior art are avoided and which, in addition, can be accomplished in many design shapes of the closures.

The above and other objects of this invention are attained by a closure wherein the main film hinge uninterruptedly or continuously extends through an area bridged by a spring element, and in a closed state of the closure the spring element is positioned within the closed closure. If the first and the second closure parts of the plastic closure each have straight wall sections extending parallel to the main film hinge, which are at least twice as long as the width of the spring element, this plastic closure can be produced very easily. In accordance with the invention, such closures can be realized by the process discussed below.

In particular, this invention includes a one-piece plastic closure, for fastening to a container, having a lower part which is a first part that can be connected directly or indirectly with the container, and a cap which is a second closure part that is integral with the lower part, via the main film hinge located in the pivot axis. Furthermore, there is a spring element which generates a snap effect. The spring element extends beyond the film hinge and is hingedly connected at one end to the lower part and at the other end to the cap.

A closure of this type can be realized by the process discussed in this specification and in the claims.

Various exemplary embodiments of the plastic closure of the invention are illustrated by way of example in the subsequent description, particularly when taken in view of the drawings.

DESCRIPTION OF PREFERRED EMBODIMENTS

Figure 1:
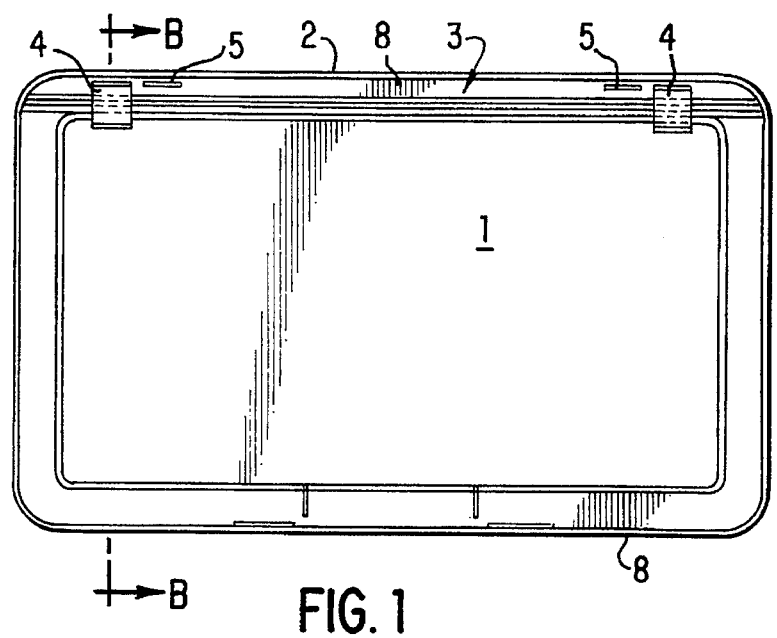
FIG. 1 is a bottom view of a large rectangular closure designed with an extremely long continuous main film hinge, according to one preferred embodiment of this invention.
Figure 2:
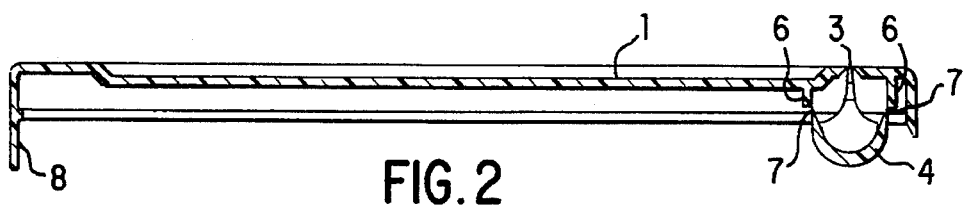
FIG. 2 is an enlarged cross-sectional view of the same closure of FIG. 1, taken along the line B—B, in the area of the spring element bridging the main film hinge.
Figure 3:
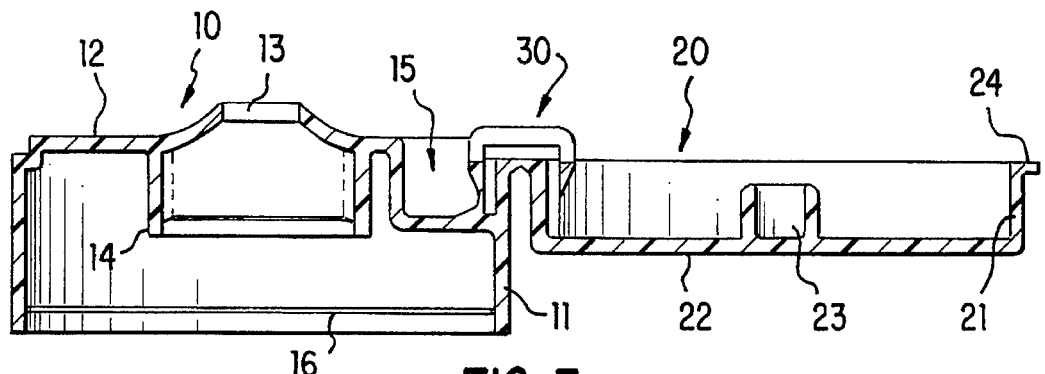
FIG. 3 is a diametric cross-sectional view of a round closure in a completely open production position, according to another preferred embodiment of this invention.
Figure 4:
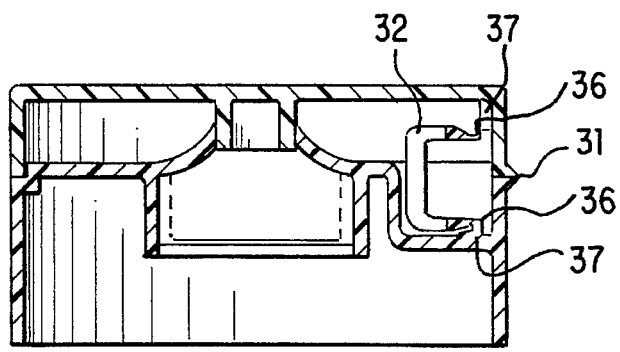
FIG. 4 is a cross-sectional diametric view of the same closure shown in FIG. 3, in the closed position.
Figure 5:
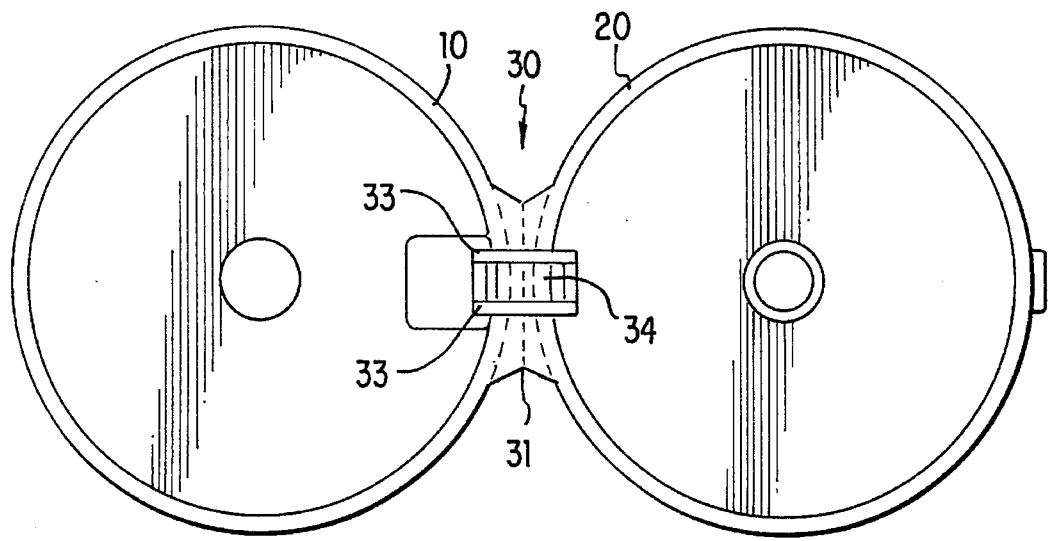
FIG. 5 is a top view of the closure shown in FIG. 3, shown in an open position.

The two preferred embodiments of this invention that are shown in detail in FIGS. 1 and 2 and in FIGS. 3 to 5 are only intended to illustrate the wide range of the various embodiments of the plastic closure of this invention. The shapes of other plastic closures with which the principle of this invention can be used are almost limitless. While the first embodiment shown in FIGS. 1 and 2 is a closure for a rectangular container, for example for receiving detergent, the closure shown in FIGS. 3 to 5 is suitable, for example, for placement on a plastic bottle for cosmetics or liquid or pasty food.

The plastic closure shown in FIG. 1 has a rectangular basic shape. It is shown in a view from below, i.e. the surface which in the mounted state of the closure is oriented toward the interior of the container is visible. This closure is suited for placement on an open, rectangular container. It has a first part 1 and a second part 2. The two closure parts 1 and 2 are connected with each other via a continuous main film hinge 3. Two U-shaped spring elements 4 extend over the main film hinge 3 at two areas which are relatively distant from each other. The closure part 2 has two fastening elements 5 disposed respectively in the vicinity of the two U-shaped spring elements 4. The fastening elements 5 are used for fastening the closure on the rectangular container, not shown in the drawings. A description of further details of the plastic closure, which are not relevant for purposes of this invention, is omitted. It can be clearly seen from FIG. 2 that one end of the U-shaped spring element 4 is connected with the first part 1 of the closure via an auxiliary film hinge 7 and the other end is connected with the second part 2 of the closure via an auxiliary film hinge 7 respectively on one resilient bracket structure on both sides of the main film hinge 3. The main film hinge 3 and the two auxiliary film hinges 7 extend parallel with respect to each other. In addition, FIG. 1 shows that the distance between the two spring elements 4 corresponds to a multiple of the sum of the width of both spring elements.

In particular, the distance between two adjoining spring elements 4 is at least twice as great as the width of one of the spring elements 4. This makes it possible to produce a plastic closure designed so that the interior surface of the U-shaped spring element 4 can be formed by a slide extending parallel to the film hinge 3. A closure part designed in this manner can be produced in a position in accordance with FIGS. 1 and 2, wherein the first part 1 and the second part 2 of the closure extend in the same plane. When placed on an open container, the position in accordance with FIGS. 1 and 2 corresponds to the closed state of the closure.

Besides the shape illustrated here, a closure of the same design can also be manufactured in various other embodiments. The position of the main film hinge 3 is not fixed in any particular way. Thus, such a plastic closure can also have a round or polygonal layout and the main film hinge 3 can project across such a closure in an arbitrary position. In this case, the main film hinge 3 extends crosswise over the closure surface without any interruption.

The shape of the spring elements 4 shown in the drawings is not mandatory. The spring elements 4 only need to be spatially designed in such a way that they bridge the main film hinge 3 at a sufficient distance. For example, the cross-sectional shape of such a spring element 4 can be U-shaped or V-shaped or semi-cylindrical.

A preferred embodiment of a plastic closure in accordance with this invention is illustrated in FIGS. 3 to 5. Such embodiment is suited for mounting on a container, in particular a plastic bottle with liquid or pasty contents. The three main components of the plastic closure are the first closure part 1, which forms the lower part 10, the second closure part 2, which forms the cap 20, and the hinge 30 which is a one-piece connection between the two closure parts 1, 2. The lower closure part 10 shown in FIGS. 3 to 5 has a cylindrical shell wall 11 which, with the exception of a spout 13, is completely sealed by a cover 12. In the lower area of the cylindrical shell wall 11 a fastening means 16 is provided for holding the plastic closure on a container. The fastening means 16 can have various embodiments, such as a screw thread, holding ribs or, as illustrated, an annular ring. An annular wall 14, used as a sealing connection of the closure with the container spout, extends on the underside of the cover 12, concentrically with respect to the spout 13. A depression 15 is placed in the cover 12 in the area between the hinge 30 and the spout 13. In the closed state of the plastic closure, there is a space for a spring element, which can be clearly seen in FIG. 4.

The second closure part 2, here embodied as the cap 20, also has a cylindrical shell wall 21 which preferably has the same diameter as the shell wall of the lower part 10. The cap 20 is closed off by a cover 22.

A sealing tang 23 is disposed centered on the interior of the cover 22 and fits sealingly into the spout 13 of the lower part 10. A pressure bead 24 is formed on the lower edge of the shell wall 21 diametrically opposite from the hinge 30. The pressure bead 24 is used to aid in opening the plastic closure.

The exterior shape of the plastic closure is not limited to cylindrical shapes. Polygonal or oval shapes, for example, are possible as well as closures with conically extending shell walls 11, 21.

The hinge, indicated in its totality by element reference numeral 30, has two main components, namely the main film hinge 31 and the spring element 32. In the embodiment here illustrated, the spring element 32 is divided into two partial spring elements 33, for reasons of manufacturing technology and to set the snap effect at a reasonable rate. Thus an interspace 34 remains between the two partial spring elements 33. If, as in the previously described embodiment, the spring element 32 of the plastic closure is produced in the injection mold by a lateral pull or slide, the spring element 32 can be continuously designed, without an interruption, such as the spring element 4 shown in FIGS. 1 and 2. The spring element 32 is connected via thinned areas 36 in the form of auxiliary film hinges with the lower part 10 on the one side and with the cap 20 on the other side. In the completely open state of the plastic closure, the two thinned areas 36 are on the same level. To attain this, a corresponding bracket 37 is provided in both the lower part 10 as well as in the cap 20.

Reference is made to FIGS. 6 to 9 regarding the exact spatial layout of the two partial spring elements 33.

Figure 6:
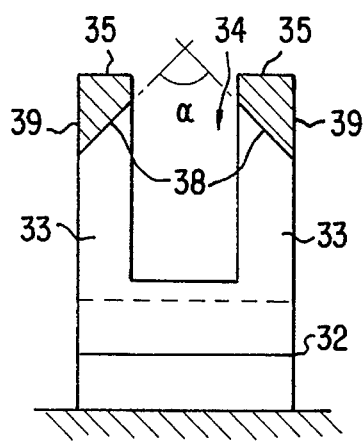
FIG. 6 shows one preferred embodiment of a spring element of a closure, in a vertical sectional view, parallel to the main film hinge.
Figure 7:
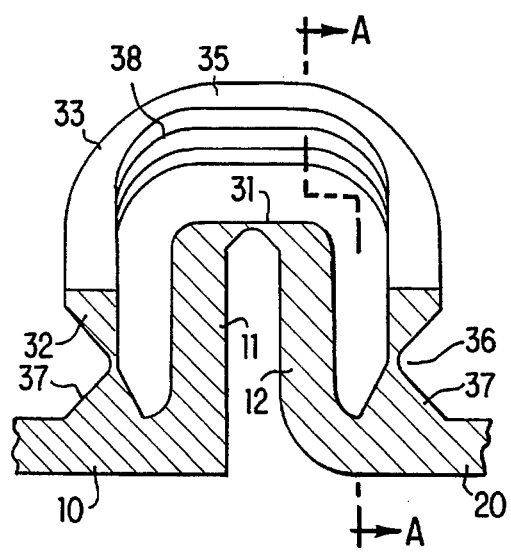
FIG. 7 shows a second vertical sectional view of the same spring element of FIG. 6, perpendicular to the direction of extension of the main film hinge.

The plastic closure of FIGS. 3 to 5 can be equipped with a hinge in accordance with FIGS. 6 and 7. The two partial spring elements 33 can be clearly recognized, which together form the spring element 32, which on one end is connected via a thinned area 36 to the lower part 10 and on the other end via a thinned area 36 to the cap 20. The two shell walls 11 and 21 of the two closure parts are hingedly connected with each other via the main film hinge 31. In the view of FIG. 6 it is possible to see clearly the interspace 34 between the two partial spring elements 33, which cannot be seen in FIG. 7 because the cutting plane extends in the interspace 34. The two U-shaped partial spring elements 33 extend parallel to each other and are arranged in such way that the respective arch of the U is upwardly oriented in the completely opened state of the plastic closure. In the area of their arch 35, the cross-sectional surface of the two U-shaped partial spring elements 33 is designed such that their thickness is reduced from the outside in the direction toward the interspace 34. Thus, the interior surfaces 38 are inclined toward each other and enclose an angle α which ranges from acute to obtuse. The other elements of the hinge, namely the two thinned areas 36 and the brackets 37 can be seen. The exterior lateral surfaces of the two partial spring elements 33 are designated by element reference numeral 39. Such designation is in view of the later description of the manufacturing techniques.

Figure 8:
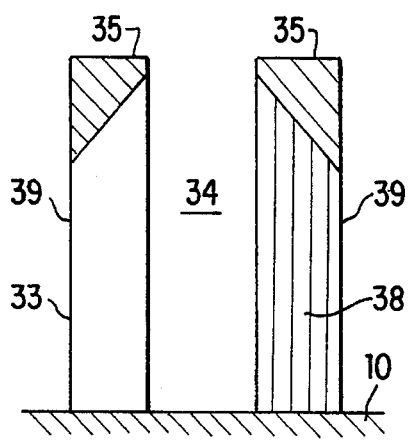
FIG. 8 shows another embodiment of a spring element, in the same view as that shown in FIG. 6.
Figure 9:
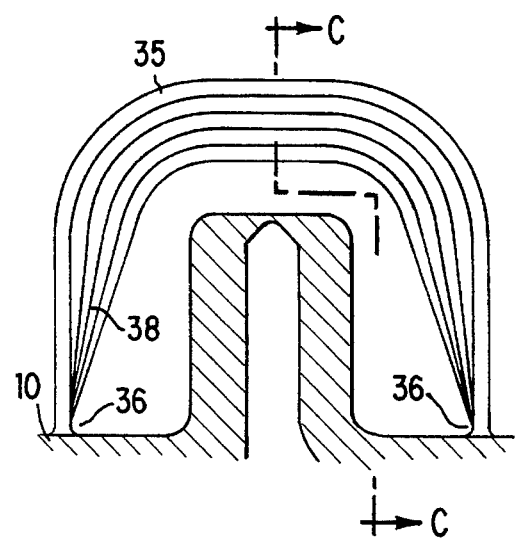
FIG. 9 shows the spring element of FIG. 8, in a similar illustration as the spring element shown in FIG. 7.

While in the embodiment shown in FIGS. 6 and 7 the thinned areas 36 are disposed on their exterior surfaces with respect to the U and constitute the connection between the brackets 37 and the spring element 32, the thinned areas 36 in the embodiment of FIGS. 8 and 9 are also the connecting areas of the spring element 32 on the lower part 10 or on the cap 20. It is also possible that they provide the connection with the plastic closure parts via appropriate brackets. However, in contrast to the previously described embodiment, the constriction for forming the thinned areas 36 does not occur from the outside of the U-shaped spring element, but from the inside. So that the partial spring elements 33 are not sheared off during the removal from the mold, it is preferred that the transition from the thinned areas 36 to the arch 35 extends continuously. Thus, while in the previously described embodiment the straight extending area of the legs of the U-shaped partial spring elements 33 have a rectangular cross section, in the preferred embodiment shown in FIGS. 8 and 9 the legs have a continuously changing trapezoidal cross-sectional shape. As a result, the U-shaped partial spring elements 33 have, over their entire length between the two thinned areas 36 and the lower part 10 or the cap 20, a cross-sectional shape which tapers in a direction toward the interspace 34. Therefore, the interior surfaces 38 of the two partial spring elements 33 are inclined toward each other, with the exception of the area of the thinned area 36.

Figure 10:
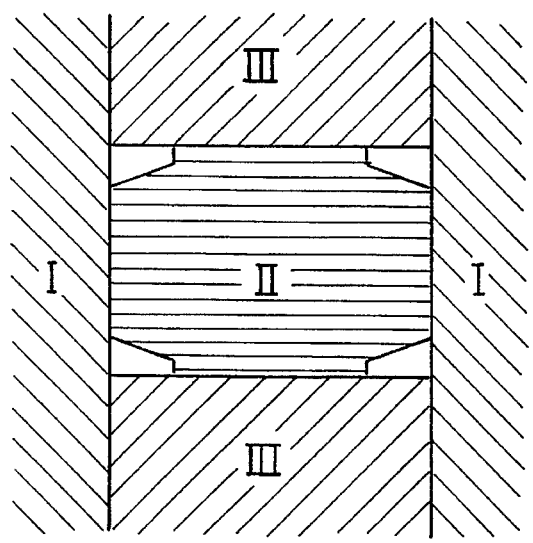
FIG. 10 shows a diagrammatic horizontal section through an injection mold for producing a plastic closure with the spring element according to the embodiment of FIGS. 6 and 7.
Figure 11A:
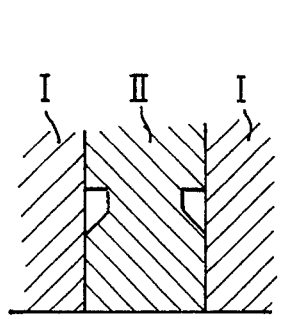
FIGS. 11a to 11d illustrate process steps according to this invention, for removing a plastic closure with the spring elements in accordance with FIGS. 6 to 9.
Figure 11B:
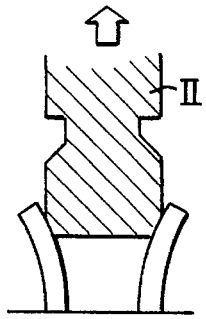
Figure 11C:
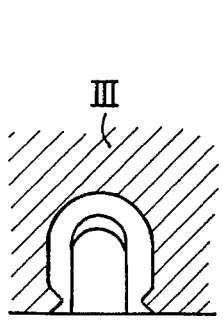
Figure 11D:
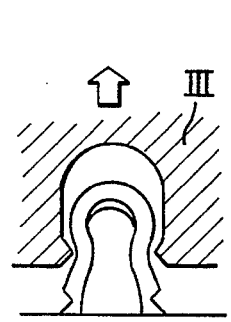

While there is sufficient space when producing relatively large plastic closures and it is therefore easily possible to include slides or lateral pulls in the injection mold, this is impractical in connection with small plastic closures, and also very expensive, because multiple-use tools are often employed. The more that closures are produced in a single injection mold, the more expensive it is to include slides or lateral pulls. However, because of the layout of the plastic closures of FIGS. 3 to 9, it is possible to produce such closures without slides or lateral pulls. Instead, the injection molds are divided into several parts and the individual tool parts are operated in a defined sequence for unmolding. The area of the hinge is particularly complex. FIG. 10 schematically shows how a horizontal section through such a multipart tool can look in the area of the hinge. A tool part I, which essentially molds the entire surface structure of the lower part at the surface and the cap on the interior surface, also limits the exterior lateral surfaces 39 of the two partial spring elements 33. An interior die-shaped tool part II molds the interior boundary surfaces 38 of the partial spring elements 33. The exterior boundary surfaces of the two partial spring elements are molded by the tool part III. This situation is also schematically illustrated in FIGS. 11a to 11d, in the course of the unmolding process. The completely closed mold is shown in FIG. 11a. The somewhat triangular surfaces show the two partial spring elements in section in the area of the two U-shaped arches. The tool part I is removed in a first unmolding step.

Thus, the lateral boundary surfaces 39 of the partial spring elements 33 are freed. In a second step, it is possible to pull back the tool part II, which extends below the two adjoining partial spring elements 33. Since now the lateral restriction by the tool part I is no longer present, the two partial spring elements 33 can laterally pivot out. This is possible in that the interior surfaces 38 are formed so that they incline in the direction toward the interspace 34. In a final unmolding step in accordance with FIGS. 11c and 11d it is possible to remove the tool part which molds the exterior surface of the two partial spring elements 33. If the constrictions constituting the thinned areas 36 are disposed on the exterior surfaces of the spring element, unmolding is only possible after the tool part II extending below the two partial spring elements 33 is moved away. Only then is it possible to compress the U-shaped spring element freely during unmolding and to remove them through the constricted portion of the tool part. If the spring elements are designed without the constrictions at the outsides of the U-shaped spring elements, as shown in FIGS. 8 and 9, a plastic closure of this type requires only two tool parts which can be moved relative to each other. In this case, the two tool parts II and III shown in FIG. 10 can be embodied as one piece. The tool part I is pulled away in a first step and then the second tool part is pulled away, wherein again the two partial spring elements are laterally pushed against each other during unmolding.

The plastic closure in accordance with this invention permits the design of especially esthetic embodiments and can also be mass-produced without additional cost.

I claim:

1. In a one-piece plastic closure for fastening on a container, having a lower part (10) attachable to the container, a cap (20) which is integral with the lower part (10) by a main film hinge (31) positioned in a pivot axis, a spring element (32) capable of generating a snap effect, the spring element (32) extending beyond the main film hinge (31) and hingedly connected at one end to the lower part (10) and at an opposite end to the cap (20), the improvement comprising: the main film hinge (31) extending continuously over the spring element (32) which, in a closed state of the closure, is positioned completely within the closure.

2. A plastic closure in accordance with claim 1, further comprising two U-shaped partial spring elements (33) extending parallel to each other and having an interspace (34) between the U-shaped partial spring elements (33).

3. A plastic closure in accordance with claim 2, wherein an interior surface (38) of each of the U-shaped partial spring elements (33) extends between the two U-shaped partial spring elements (33) inclined towards the interspace (34) at least in an area of two U-shaped arches (35) of the U-shaped partial spring elements (33), such that a thickness of each of the two partial spring elements (33) tapers toward the interspace (34).

4. A plastic closure in accordance with claim 2, wherein a hinged connection between the spring elements (33) and one of the lower part (10) and the cap (20) comprises thinned areas (36) extending at least approximately parallel to the main film hinge (31) and disposed in exterior surfaces of the U-shaped partial spring elements (33).

5. A plastic closure in accordance with claim 3, wherein the U-shaped partial spring elements (33) have a cross-sectional shape tapering in a direction toward the interspace (34) over an entire length of each partial spring element (33)

between the thinned areas (36) and one of the lower part (10) and the cap (20).

6. A plastic closure in accordance with claim 1, wherein the lower part (10) comprises a cover (12) with a spout (13) disposed on the cover (12) and a closed depression (15) in an area between the spout (13) and the main film hinge (31), and the spring element (32) is at least partially received within the closed depression (15) in the closed state of the closure.

7. A plastic closure in accordance with claim 1, wherein the spring element (32) is connected via hinged thinned areas (36) with the lower part (10) and the cap (20), and the hinged thinned areas (36) are disposed on brackets (37) on a cover (12) of the lower part (10) and on an interior surface (22) of the cap (20).

8. In a plastic closure having a first part (10) attachable to a container, a second part (20) connected in one piece with the first part (10) by a main film hinge (31), a spring element (32) which engages the first part (10) and the second part (20) and bridges an axis of rotation of the main film hinge (31) and generates a snap effect, the improvement comprising: the main film hinge (31) continuously extending through an area in which the main film hinge (31) is bridged by the spring element (32), and in a closed state of the plastic closure the spring element (32) is positioned completely within a continuous shell wall of the closure.

9. In a plastic closure in accordance with claim 8, wherein a distance between two adjoining said spring elements (32) is at least two times a width of the spring element (32).

10. In a one-piece plastic closure for fastening on a container, having a lower part (10) attachable to the container, a cap (20) which is integral with the lower part (10) by a main film hinge (31) positioned in a pivot axis, a spring element (32) capable of generating a snap effect, the spring element (32) extending beyond the main film hinge (31) and hingedly connected at one end to the lower part (10) and at an opposite end to the cap (20), the improvement comprising: the main film hinge (31) extending continuously over the spring element (32), the spring element (32) having two U-shaped partial spring elements (33) extending parallel to each other and having an interspace (34) between the U-shaped partial spring elements (33), an interior surface (38) of each of the U-shaped partial spring elements (33) inclined toward the interspace (34) at least in an area of two U-shaped arches (35) of the U-shaped partial spring elements (33), such that a thickness of each of the two partial spring elements (33) tapers toward the interspace (34), and in a closed state of the closure, the spring element is (32) positioned completely within the closure.

11. A plastic closure in accordance with claim 10, wherein a hinged connection between the spring elements (33) and one of the lower part (10) and the cap (20) comprises thinned areas (36) extending at least approximately parallel to the main film hinge (31) and disposed in exterior surfaces of the U-shaped partial spring elements (33).

12. A plastic closure in accordance with claim 10, wherein the U-shaped partial spring elements (33) have a cross-sectional shape tapering in a direction toward the interspace (34) over an entire length of each partial spring element (33) between the thinned areas (36) and one of the lower part (10) and the cap (20).

13. A plastic closure in accordance with claim 10, wherein the lower part (10) comprises a cover (12) with a spout (13) disposed on the cover (12) and a closed depression (15) in an area between the spout (13) and the main film hinge (31), and the spring element (32) is at least partially received within the closed depression (15) in the closed state of the closure.

14. A plastic closure in accordance with claim 10, wherein the spring element (32) is connected via hinged thinned areas (36) with the lower part (10) and the cap (20), and the hinged thinned areas (36) are disposed on brackets (37) on a cover (12) of the lower part (10) and on an interior surface (22) of the cap (20).

* * * * *